United States Patent
Almaleh et al.

(10) Patent No.: US 7,127,272 B1
(45) Date of Patent: Oct. 24, 2006

(54) DESIGNING ANTENNA SYSTEMS

(75) Inventors: Lawrence J Almaleh, Overland Park, KS (US); Douglas L Machamer, Overland Park, KS (US); Nichole D Rowland, Kansas City, MO (US); Todd A Rowley, Leawood, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 476 days.

(21) Appl. No.: 10/083,871

(22) Filed: Feb. 27, 2002

Related U.S. Application Data

(60) Provisional application No. 60/271,842, filed on Feb. 27, 2001.

(51) Int. Cl.
H04B 1/38 (2006.01)

(52) U.S. Cl. .............. 455/561; 455/562.1; 455/575.7; 342/423; 342/454

(58) Field of Classification Search ............ 455/3.1, 455/3.2, 5.1, 66, 422, 454, 446, 562, 13, 455/7; 348/725, 584, 10, 12, 13; 370/328; 343/824
See application file for complete search history.

(56) References Cited

U.S. PATENT DOCUMENTS

| | | | | |
|---|---|---|---|---|
| 5,751,707 A | * | 5/1998 | Voit et al. .................... 370/384 |
| 5,839,050 A | * | 11/1998 | Baehr et al. ................ 455/2.01 |
| 5,924,039 A | * | 7/1999 | Hugenberg et al. .......... 455/454 |
| 6,052,582 A | * | 4/2000 | Blasing et al. ............ 455/562.1 |
| 6,310,661 B1 | * | 10/2001 | Arsenault .................... 348/725 |
| 6,400,320 B1 | * | 6/2002 | Stilp et al. ................... 342/457 |
| 6,400,697 B1 | * | 6/2002 | Leung et al. ................ 370/328 |
| 6,788,926 B1 | * | 9/2004 | Frangione et al. ........... 455/405 |
| 6,847,820 B1 | * | 1/2005 | Hageltorn et al. ........... 455/446 |
| 6,963,552 B1 | * | 11/2005 | Sabat et al. ................. 370/338 |

* cited by examiner

*Primary Examiner*—Edward F. Urban
*Assistant Examiner*—Thuan Nguyen
(74) *Attorney, Agent, or Firm*—Kyle J. Way

(57) ABSTRACT

A design system designs a first antenna system in a communication system. The design system retrieves demographic information of customers from a first database system. The design system determines communication traffic based on the demographic information. The design system retrieves parameters of a second antenna system from a second database system. The design system determines an antenna system configuration for the first antenna system based on the communication traffic and the parameters of the second antenna system. The design system then determines a performance of the first antenna system in response to determining the antenna system configuration for the first antenna system.

57 Claims, 9 Drawing Sheets

| TOPOGRAPHY ||
|---|---|
| Field Description | |
| Location: | |
| Latitude | |
| Longitude | |
| Elevation | |

FIG. 5

| VECTOR ||
|---|---|
| Field Description | |
| Primary Roads | |
| Secondary Roads | |
| County Boundaries | |

FIG. 6

| IMAGE ||
|---|---|
| Field Description | |
| Location: | |
| Latitude | |
| Longitude | |
| City | |
| State | |

FIG. 7

| TOWER ||
|---|---|
| Field Description | |
| Location: | |
| Latitude | |
| Longitude | |
| City | |
| State | |
| Own Property | |
| Lease Property | |

FIG. 8

| INCUMBENT SITE | |  |
|---|---|---|
| Field Name | Description |  |
| Rbs | Site ID |  |
| MMDS | Project Type |  |
| Position | Latitude/ Longitude |  |
| Rad | Radius |  |
| Mod | Propagation Model |  |
| Pwr | Antenna Power |  |
| Frq | Frequency |  |
| Azm | Antenna Azimuth |  |
| Aht | Antenna Height |  |
| Typ | Antenna Type |  |
| P | Antenna Polarization |  |
| N | Number of Channels |  |
| D | Data Rate |  |
| Ag | Antenna Gain |  |

FIG. 9

| DEMOGRAPHIC | |
|---|---|
| Field Description |  |
| Residential Low Speed |  |
| Residential High Speed |  |
| Residential Usage |  |
| Residential Weighted Average Data Throughput |  |
| Business Low Speed |  |
| Business High Speed |  |
| Business Usage |  |
| Business Weighted Average Data Throughput |  |

FIG. 10

| MORPHOLOGY | | | | |
|---|---|---|---|---|
| Considerations Reference City | Type 1 City Heavy Market >700 k HH | Type 1 City Med Market 250-700 k HH | Type 1 City Small Market 75-250 k HH | Type 1 City Very Small Market <75 k HH |
| Morph, Type | | | | |
| 0 Water | 0 | 0 | 0 | 0 |
| 1 Wetland | 1 | 1 | 1 | 1 |
| 3 Tundra | 1 | 1 | 1 | 1 |
| 4 Bare Ground | 2 | 2 | 2 | 2 |
| 12 Residential Area | 100 | 80 | 70 | 50 |
| 13 Commercial and Services | 20 | 20 | 15 | 10 |
| 14 Transportation and Utilities | 10 | 10 | 5 | 5 |
| 15 Urban Areas | 60 | 50 | 20 | 10 |

FIG. 11

DESIGNING ANTENNA SYSTEMS

RELATED APPLICATIONS

This application claims the benefit of provisional application 60/271,842, filed Feb. 27, 2001, which hereby is incorporated by reference into this application.

FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to the field of telecommunications, and in particular to the design of antenna systems within communication systems.

2. Description of the Prior Art

Communication providers use antenna systems to implement wireless communications. One example of an antenna system provides broadband wireless service. Customers that subscribe to broadband wireless service communicate with a head end. A specific type of broadband wireless system communicates over Multichannel Multipoint Distribution Service (MMDS) frequencies and Multipoint Distribution Service (MDS) frequencies. The MMDS frequencies range from 2500 MHz to 2686 MHz. The MDS frequencies range from 2150 MHz to 2162 MHz. In a typical MMDS system, the bandwidth of the upstream channels is about 6 MHz.

A head end manages the upstream and downstream channels with the customer. The head end also interfaces the customer with communication networks such as the Internet. The head end includes a base antenna comprised of a transmitter antenna and one or more receiver antennas. MMDS requires a line of sight between devices that are communicating. Therefore, the antennas are placed on a high building or a mountain to establish lines of sight with the customers.

The transmitter antenna is omni-directional and broadcasts data from the head end to the customers on the downstream channels. In a two-way wireless system, the receiver antennas are positioned to receive MMDS signals transmitted from customers to the head end on the upstream channels. Each receiver antenna is positioned to receive MMDS signals from customers located within a certain area. The areas formed by the antennas are referred to as sectors. The sectors have designated frequency ranges or designated channels.

With geographic and government regulations, many antenna systems are complex and costly to develop. Some government regulations further increase costs of antenna systems since the antenna systems must also be licensed with respect to power of wireless signals, location of use for the wireless signals, and frequency of the wireless signals. The government regulations provide many challenges when designing and implementing an antenna system. Each new form of antenna system requires a new design and a new implementation. New designs and implementations require new government licenses for power, location, and frequency.

One critical requirement to antenna system design is the decision of the location of the antenna system. The location of the antenna system depends on maximization of customers, geographic constraints, technical constraints, and government regulations. Thus, the decision process of determining the location and configuration of the antenna system is quite complex.

One design system exists which reduces costs associated with antenna system development and government licensing. The design system, called CelPlan® is instrumental is assisting communication providers with development of complex antenna systems. CelPlan® is designed to provide accurate predictions in all commercial frequency ranges for analog, TDMA, and CDMA technologies. However, CelPlan® creates new antenna system designs based on new antenna equipment and locations. Many communication providers have existing equipment that can be modified to work with new antenna systems, but CelPlan® is not capable of using information about existing equipment.

SUMMARY OF THE INVENTION

The inventions solve the above problems by designing a first antenna system in a communication system. A design system retrieves demographic information of customers from a first database system. The design system determines communication traffic based on the demographic information. The design system retrieves parameters of a second antenna system from a second database system. The design system determines an antenna system configuration for the first antenna system based on the communication traffic and the parameters of the second antenna system. The design system then determines a performance of the first antenna system in response to determining the antenna system configuration for the first antenna system.

In some embodiments, the design system repeatedly determines the antenna system configuration for the first antenna system and determines the performance of the first antenna system until the first antenna system is optimized based on a maximum number of users, a geographic location, and government restrictions. In one embodiment, the design system generates an antenna output based on the antenna system configuration and the performance of the first antenna system. In some embodiments, the demographic information comprises age, income of the customers, and an indication of whether the customer is residential or business. In other embodiments, the parameters comprise a location, property rights, frequency, and power of the second antenna system.

In some embodiments, the first antenna system comprises a fixed wireless communication system. In other embodiments, the second antenna system comprises a cellular antenna system. In some embodiments, the design system determines a location of the first antenna system. In some embodiments, the design system calculates a weighted average throughput.

Advantages of the embodiments include providing a means for generating an antenna system that incorporates elements of existing antenna systems. Other advantages include providing an efficient means for preparing a government licenses pertaining to antenna system design.

BRIEF DESCRIPTION OF THE DRAWINGS

FIG. 5 is a topography data structure in an example of the invention.

FIG. 6 is a vector data structure in an example of the invention.

FIG. 7 is an image data structure in an example of the invention.

FIG. 8 is a tower data structure in an example of the invention.

FIG. 9 is an incumbent site data structure in an example of the invention.

FIG. 10 is a demographic data structure in an example of the invention.

FIG. 11 is a morphology data structure in an example of the invention.

A particular reference number in one figure refers to the same element in all of the other figures.

DETAILED DESCRIPTION OF THE DRAWINGS

Figure 1:
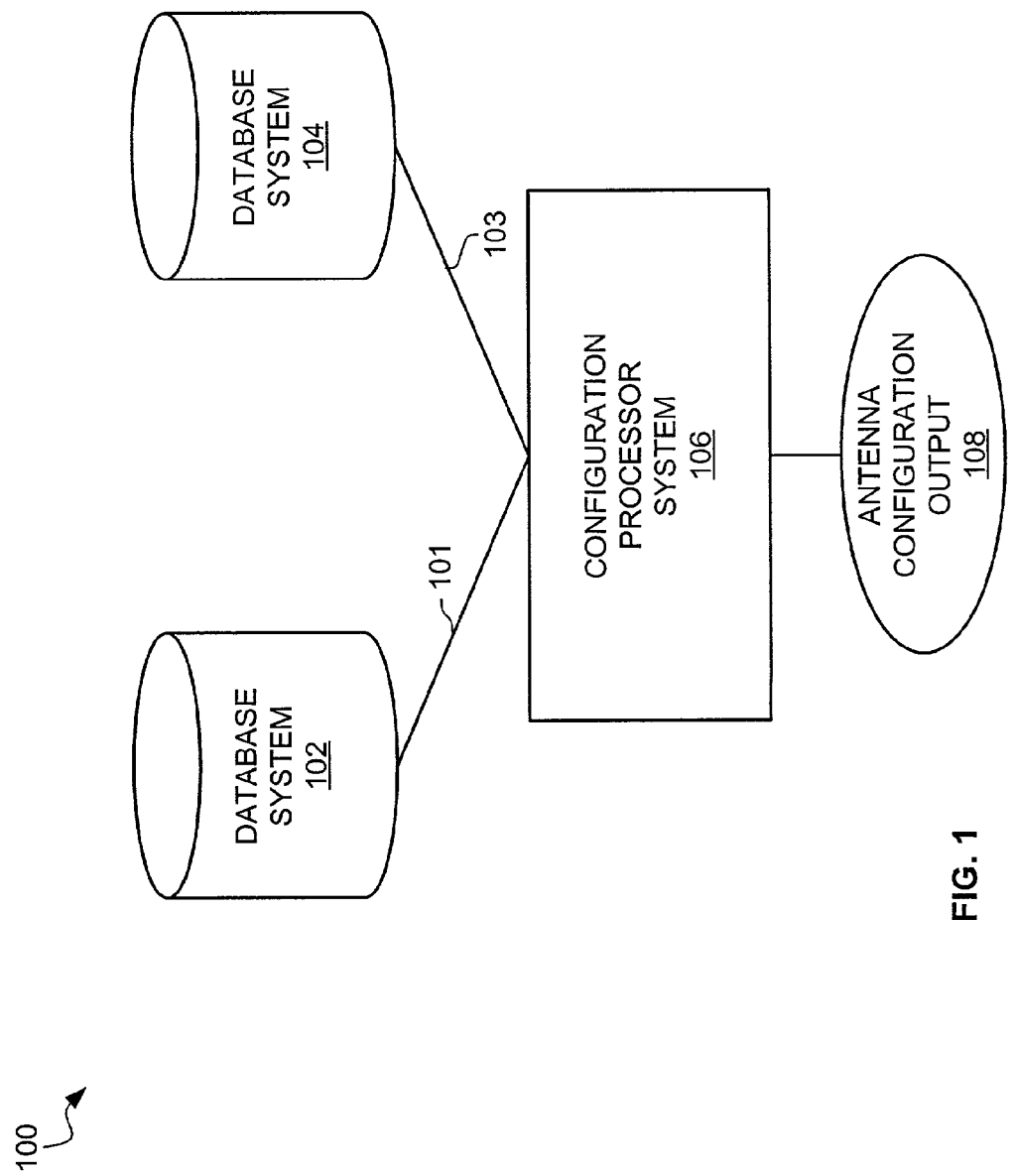
FIG. 1 is a diagram of a design system in an example of the invention.
Figure 2:
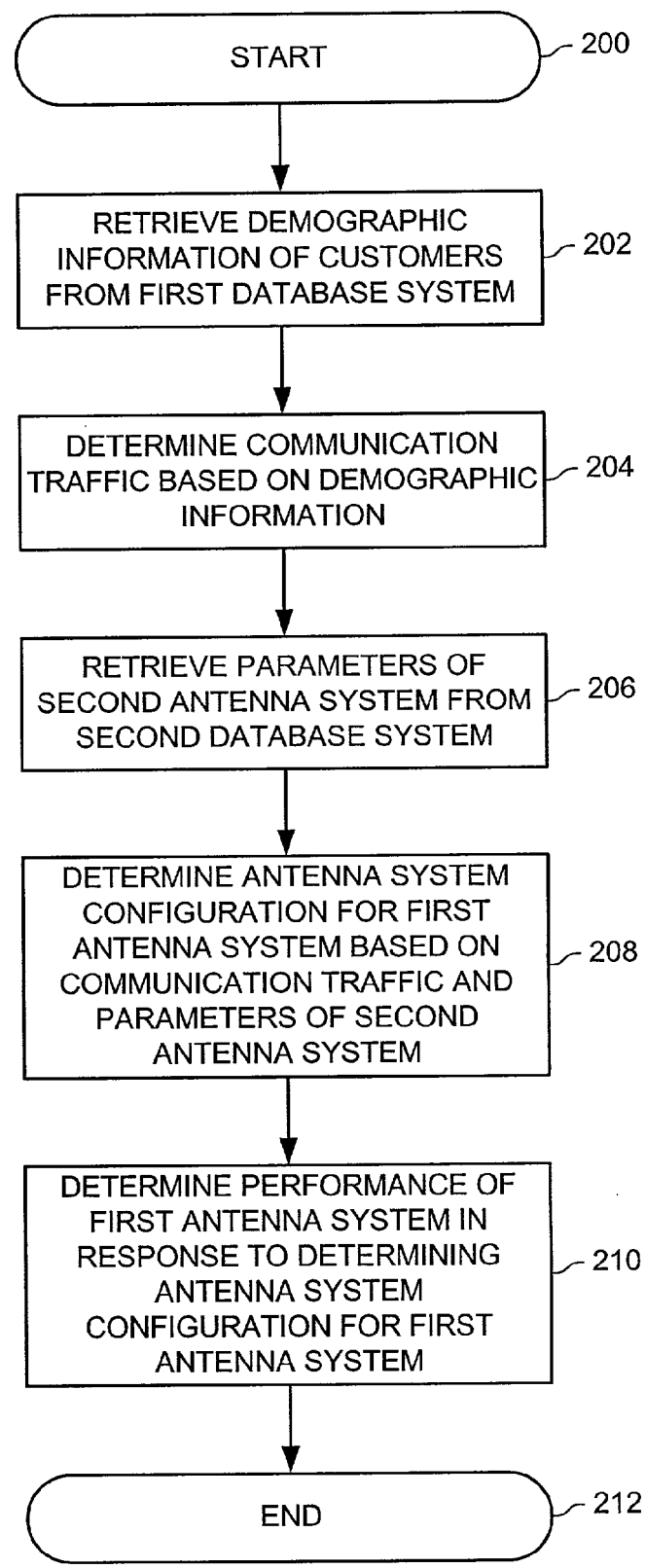
FIG. 2 is a flow chart of the design system in an example of the invention.

Design System—FIGS. 1–2

FIG. 1 illustrates a diagram of a design system 100 in an example of the invention. The design system 100 comprises a database system 102, a database system 104, a configuration processor system 106, and an antenna configuration output 108. The configuration processor system 106 is connected to the database system 102 via a link 101. The database system 104 is connected to the configuration processor system 106 via a link 103. The configuration processor system 106 is connected to the antenna configuration output 108.

The database system 102 is any system or storage device configured to store demographic information of customers. The demographic information is any data or information that indicates characteristics of potential customers in a market. One example of the demographic information is data from a marketing database that includes ages, incomes, and sexes of the potential customers. In another example, demographic information includes an indication of whether the potential customer is residential or business. The database system 104 is any system or storage device configured to store parameters of a second antenna system. The antenna system is any system or group of devices that include antennas for use in wireless communication systems. The parameters of an antenna system are any data or information that indicates characteristics of an antenna system. One example of the parameters of an antenna system includes a frequency range, location of the antenna system, and the configuration of the antenna system. In other embodiments, the database system 102 and the database system 104 are combined into one database.

Configuration processor system 106 is any system configured to (1) retrieve demographic information of customers from the database system 102, (2) determine communication traffic based on the demographic information, (3) retrieve parameters of a second antenna system from the database system 104, (4) determine an antenna system configuration for the first antenna system based on the communication traffic and the parameters of the second antenna system, and (5) determine a performance of the first antenna system in response to determining the antenna system configuration for the first antenna system. The communication traffic is any exchange of a signal, message, or instruction for the purposes of communication. An example of communication traffic is a transmission of a signal from a cellular telephone to a cellular antenna system. The antenna system configuration is a design of at least one structure that includes at least one antenna. An example of the antenna system configuration is a design of a plurality of cellular antenna towers for a communication market.

The antenna configuration output 108 includes any means for displaying the antenna system configuration or the performance of the antenna system. An example of the antenna configuration output 108 could be a printout, a computer monitor, or another display device. In some embodiments, the first antenna system comprises a fixed wireless communication system. In one embodiment, the first antenna system comprises a Multichannel Multipoint Distribution System (MMDS), and the second antenna system comprises a cellular antenna system.

FIG. 2 depicts a flow chart of the design system in an example of the invention. FIG. 2 begins in step 200. In step 202, the configuration processor system 106 retrieves the demographic information of customers from the database system 102. In step 204, the configuration processor system 106 determines communication traffic based on the demographic information. In step 206, the configuration processor system 106 then retrieves parameters of a second antenna system from the database system 104. The configuration processor system 106 then determines an antenna system configuration for the first antenna system based on the communication traffic and the parameters of the second antenna system in step 208. In step 210, the configuration processor system 106 determines a performance of the first antenna system in response to determining the antenna system configuration for the first antenna system. FIG. 2 ends in step 212. In one embodiment, steps 208 and 210 are repeated until the first antenna system is optimized based on a maximum number of users, a geographic location, and government restrictions.

Design System with Various Database Systems—FIGS. 3–12

FIGS. 3–12 disclose one embodiment of the invention, but the invention is not restricted to the configuration provided below. Those skilled in the art will appreciate numerous variations in a design system configuration and operation that are within the scope of the invention. Those skilled in the art will also appreciate how the principles illustrated in this example can be used in other examples of the invention.

Figure 3:
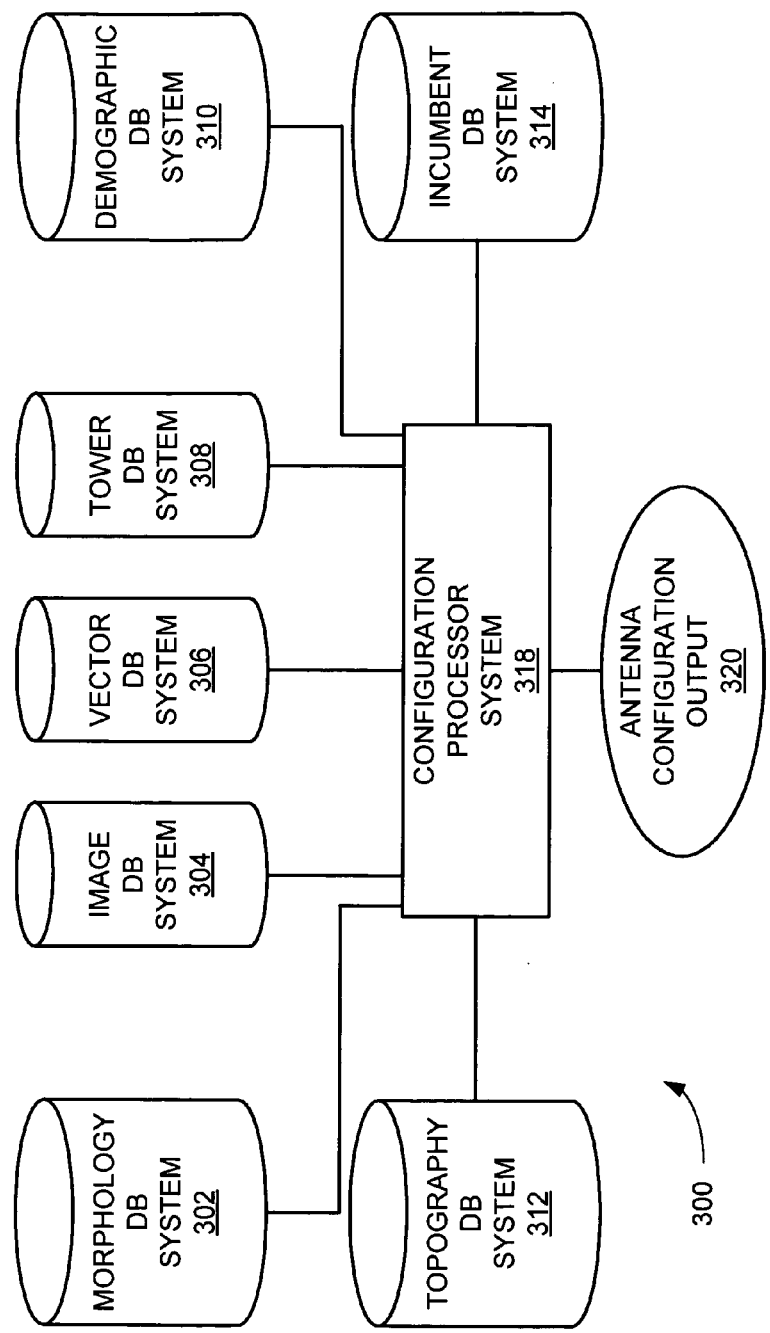
FIG. 3 is a diagram of design system in an example of the invention.

FIG. 3 depicts a diagram of design system 300 in an example of the invention. The design system 300 comprises a morphology database system 302, an image database system 304, a vector database system 306, a tower database system 308, a demographic database system 310, a topography database system 312, an incumbent database system 314, and a configuration processor system 318. The configuration processor system 318 is connected to the morphology database system 302, the image database system 304, the vector database system 306, the tower database system 308, the demographic database system 310, the topography database system 312, and the incumbent database system 314. The configuration processor system 318 is connected to the antenna configuration output 320. In other embodiment, there are various combination of the a morphology database system 302, an image database system 304, a vector database system 306, a tower database system 308, a demographic database system 310, a topography database system 312 and an incumbent database system 314 into a single or multiple database systems.

Figure 4:
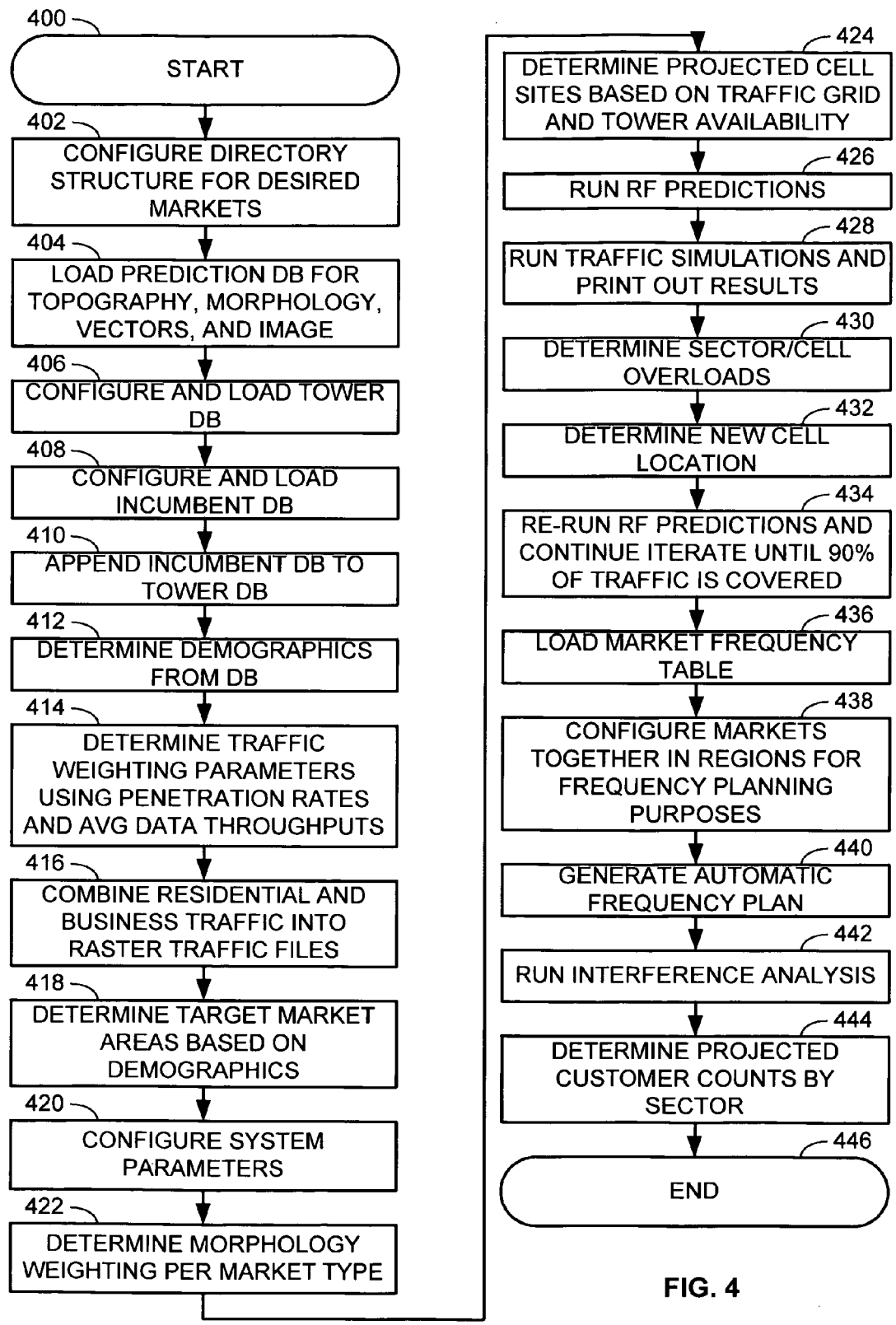
FIG. 4 is a flow chart of the designing an antenna system in an example of the invention.

FIG. 4 depicts a flow chart of the designing an antenna system in an example of the invention. FIG. 4 begins in step 400. In step 402, a directory structure for files, images, and data is configured for desired markets for an antenna system. In one embodiment, the directory structure is organized by frequency groups, images, morphology, predictions, projects, regions, topography, traffic, user data, vectors, years, and government regulations. In step 404, the configuration processor system 318 loads prediction database data from the topography database system 314, the morphology database system 302, the vector database system 306, and the image database system 304. In one embodiment, the morphology database system 302 includes a United States Geographic Survey (USGS) Land Use/Land Clutter 75m database.

In one embodiment, the topography database system 314 includes a NAD-27 3" terrain database. FIG. 5 illustrates a topography data structure of topography database system 312 of FIG. 3 in an example of the invention. The topography data structure comprises fields for containing information that pertains to topographical data. Some examples of topographical data include location and elevation. The topography data structure is used to perform a feasibility analysis and a performance analysis based on land elevations.

In some embodiments, the vector database system 306 includes roads and boundaries data. FIG. 6 illustrates a vector data structure of vector database system 306 of FIG. 3 in an example of the invention. The vector data structure comprises fields for containing information that pertains to access roads to antenna tower sites. Some examples of access roads include primary roads such as highways and urban streets. The vector data structure is used to perform a feasibility analysis based on an accessibility of potential antenna sites.

In some embodiments, the image database system 304 includes a 1:100,000 USGS map without contours. FIG. 7 illustrates an image data structure of image database system 304 of FIG. 3 in an example of the invention. The image data structure comprises fields for containing information that pertains to mapping images. Some examples of image mapping include overhead views of regions such as cities and states. The image data structure is used to illustrate potential antenna sites.

In step 406, the configuration processor system 318 configures and loads from the tower database system 308. FIG. 8 illustrates a tower data structure of tower database system 308 of FIG. 3 in an example of the invention. The tower data structure comprises fields for containing information that pertains to antenna location property. Some examples of antenna location property include location description such as longitude and latitude. Other examples of antenna location property include property rights such as leases and titles. In other embodiments not depicted in FIG. 8, the tower data structure includes frequency, power, and other characteristics of an antenna system.

In step 408, the configuration processor system 318 configures and loads from the incumbent database system 314. FIG. 9 illustrates an incumbent site data structure of incumbent database system 314 of FIG. 3 in an example of the invention. The incumbent site data structure includes information that pertains to the second antenna system. The incumbent site data structure includes field names Rbs, MMDS, Position, Rad, Mod, Pwr, Frq, Azm, Aht, Typ, P, N, D, and Ag. The field names respectively correspond to descriptions of Site ID, Project Type, Latitude/Longitude, Radius, Propagation Model, Antenna Power, Frequency, Antenna Azimuth, Antenna Height, Antenna Type, Antenna Polarization, Number of Channels, Data Rate, and Antenna Gain. The Rbs could be any identifier used to identify an existing antenna tower. The MMDS field could be any identifier used to identify an antenna tower type. The Position field could be any identifier used to identify a location of an antenna tower. An example of a Position field identifier would be a latitude and a longitude of an antenna tower. The Rad field could be any identifier used to identify a radius of antenna coverage. An example of a Rad field would be either miles or kilometers.

The Mod field could be any identifier used to identify a modulation scheme of a signal propagating from an antenna. An example of a Mod field would be Frequency Modulation (FM) or Code Division Multiple Access (CDMA). The Pwr field could be any identifier used to identify a power of an antenna. An example of a Pwr field would be in Watts (W). The Frq field could be any identifier used to identify a frequency or frequency range of an antenna. An example of an Frq field would be in Hertz (Hz). The Azm field could be any identifier used to identify an angle of propagation for an antenna. An example of an Azm field would be degrees, minutes, or seconds. The Aht field could be any identifier used to identify a height of an antenna on an antenna tower. An example of an Aht field would be Feet. The Typ field could be any identifier used to identify a type of an antenna. An example of a Typ field would be parabolic dish, whip, or horn antenna. The P field could be any identifier used to identify a polarization of an antenna. An example of a P field would be linear horizontal or linear vertical. The N field could be any identifier used to identify a number of channels for an antenna. The D field could be any identifier used to identify a data rate for a channel propagated from an antenna. An example of a D field would be in kilobits per second (kbps). The Ag field could be any identifier used to identify a gain of an antenna. An example of a gain would be in decibels (dB).

In step 410, the configuration processor system 318 appends the incumbent database system 314 with the tower database system 308. In step 412, the configuration processor system 318 determines the demographic information from the demographic database system 310. In one embodiment, the demographic information includes the residential census block group demographics and business demographics from a Dunn and Bradstreet database. In one embodiment, the configuration processor system 318 exports the demographic information from MapInfo in a MIF format. The configuration processor system 318 then imports the demographic information into CelPlanner and converts the demographic information into region files. The configuration processor system 318 then creates normalized traffic raster files based on the demographic information.

FIG. 10 illustrates a demographic data structure of the demographic database system 310 of FIG. 3 in an example of the invention. The demographic data structure comprises fields for containing information that pertains to customer billing rates for high and low data speeds of both residential and business areas. The demographic data structure also comprises fields for containing information that pertains to usage for the residential and business areas. An example of usage could be a number of bits communicated or a duration of a communication.

In step 414, the configuration processor system 318 determines traffic weighting patterns using penetration rates and average data throughputs. In one example, the demographic data structure further comprises fields for containing information that pertains weighted average data throughputs for the residential and business areas. The weighed average data throughputs are calculated as a function of a customer bill rate. The customer bill rate, CR, is calculated as follows:

$$CR = (PR)(OL)(T/R), \qquad (1)$$

where CR is the customer bill rate, PR is the product data rate, OL is an on-line percentage of daily use, T is data transmitted, and R is data received. The customer bill rate, CR, is calculated for both High Speed consumers and Low Speed consumers. The weighted average data throughput, S, is calculated as follows:

$$S = CR_{HS} + CR_{LS}, \quad (2)$$

where $CR_{HS}$ is the customer bill rate for the High Speed customers and $CR_{LS}$ is the customer bill rate for the Low Speed customers. The weighted average data throughput, S, is calculated for both residential and business consumers. The weighted average data throughput is also calculated for both for both upstream and downstream communications. The weighted average data throughput values are used to adjust a normalized communication traffic value. The normalized communication traffic value is then used to determine overall communication speed and communication channel requirements for each cellular sector. The normalized communication traffic value is a number value of transmissions and receptions obtained from communication traffic. The normalized communication traffic value is determined from a correlation of land usage and market penetration.

In step 416, the configuration processor system 318 combines the residential and business traffic into raster traffic for downstream/upstream and day/night combinations. In step 418, the configuration processor system 318 then determines target market areas based on the demographic information. In step 420, the configuration processor system 318 configures the system parameters. In one embodiment, the system parameters includes main system parameters, prediction parameters, a frequency table, a radio type configuration, subscriber service classes, prediction thresholds, hub configurations, link budgets and designations for phase, flag, and areas. In the same embodiment, these system parameters are entered into CelPlanner. The main system parameters includes power of radio base stations, designations whether the subscriber antenna is above ground or above morphology, interference/bit error rate predictions, service predictions for two way service per site or per sector, coverage predictions, composite predictions, fading margins, and rain precipitation. The prediction parameters includes terrain type, roundness factors, propagation loss, respective morphology loss, and respective penetration loss. Frequency tables includes frequencies separated by ranges, channels, sectors, and polarizations. The radio type configuration includes modulation schemes, bandwidth per carrier, roll-off factor, coding gain, channel overhead, required bit error rate, maximum data rate, and carrier to noise ratios. Subscriber service classes include transmission parameters, reception parameters, antenna parameters, and coverage universe. The prediction thresholds include thresholds for signal levels and signal to noise ratio.

In step 422, the configuration processor system 318 determines the morphology weighting per market type. FIG. 11 illustrates a morphology data structure of morphology database system 302 of FIG. 3 in an example of the invention. The morphology data structure comprises fields for containing information that pertains to a type of land or land usage as a function of market penetration. Some examples of land usage include wetland and tundra. Land variations produce unique obstacles that potentially alter radio wave propagation. Land variations also produce unique markets. The land variations are correlated with market penetration fields of heavy, medium, small, and very small markets. A correlation of land variation, or usage, and market penetration is used to produce a normalized communication traffic value.

In step 424, the configuration processor system 318 determines projected cell sites based on traffic grid and tower availability. In step 426, the configuration processor system 318 runs the RF predictions. In one embodiment, the RF predictions is for individual sites, composite upstream and downstream signal strength, composite upstream and downstream signal to noise ratio, best server upstream and downstream, and two way service predictions. In step 428, the configuration processor system 318 runs the traffic simulations and prints out the results into the antenna configurations output 320. In step 430, the configuration processor system 318 determines the sector/cell overloads. In step 432, the configuration processor system 318 determines new cell locations to meet traffic requirements. In step 434, the configuration processor system 318 re-runs the RF predictions and continues iterating until 90% of the traffic in the target market area is covered.

In step 436, the configuration processor system 318 loads the market frequency table. In step 438, the configuration processor system 318 configures the markets together in regions for frequency planning purposes. In step 440, the configuration processor system 318 generates the automatic frequency planning using CelOptima. In step 442, the configuration processor system 318 run CelFCC interference analysis. In step 444, the configuration processor system 318 determines the projected customer counts by sector.

In some embodiments, configuration processor system 318 generates government license applications. Once a potential market is identified, a channel plan for communications is generated and an initial market is evaluated. If the evaluation is positive, antenna system design begins based on the requested channel plan. The configuration processor system 318 then designs an antenna system as described above and generates a government license application. The government licenses applications include location, frequency, power, and bandwidth.

Figure 12:
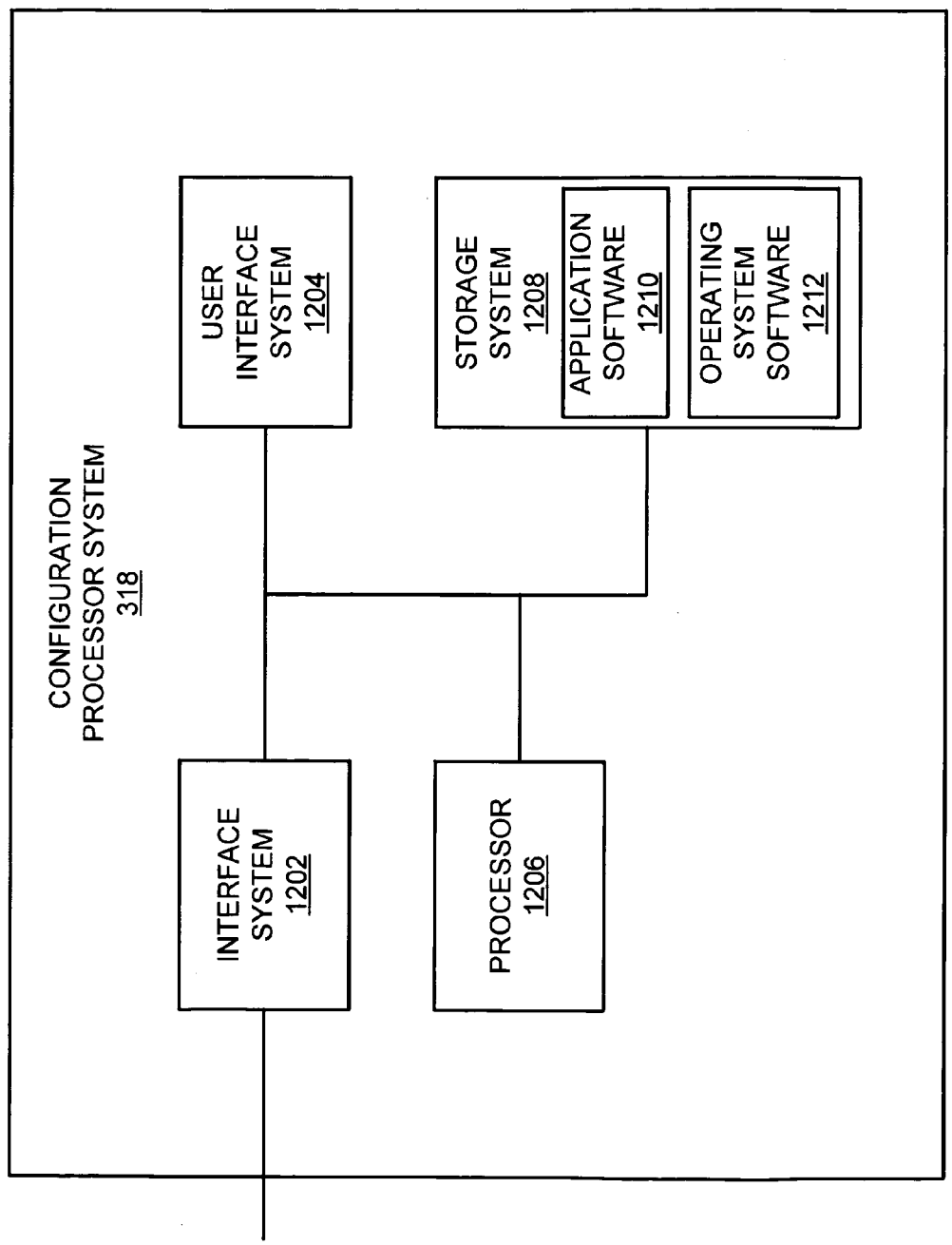
FIG. 12 is a diagram of the configuration processor system in an example of the present invention.

FIG. 12 illustrates a diagram of the configuration processor system 318 in an example of the present invention. The configuration processor system 318 includes an interface system 1202, a user interface system 1204, a processor 1206, and a storage system 1208. The storage system 1208 stores application software 1210 and operating system software 1212. The processor 1206 is connected the interface system 1202, the user interface system 1204, and the storage system 1208. The interface system 406 is connected to the database systems in FIG. 3. The configuration processor system 318 could be comprised of a programmed general-purpose computer, although those skilled in the art will appreciate that programmable or special purpose circuitry and equipment may be used. The configuration processing design system 318 may use a client server architecture where operations are distributed among a server system and client devices that together comprise elements 1202, 1204, 1206, and 1208.

The interface system 1202 could comprise a network interface card, modem, port, or some other communication device. The interface system 1202 may be distributed among multiple communication devices. The interface system 1202 interfaces with the database system depicted in FIG. 3. The user interface 1204 could comprise a keyboard, mouse, voice recognition interface, graphical display, touch screen, or some other type of user device. The processor 1206 could comprise a computer microprocessor, logic circuit, or some other processing device. The processor 1206 may be distributed among multiple processing devices. The storage system 1208 could comprise a disk, tape, integrated circuit, server, or some other memory device. The storage system 1208 may be distributed among multiple memory devices.

The processor 1206 retrieves and executes operating system software 1212 and application software 1210 from the storage system 1208. Operating system software 1212 may comprise an operating system, utilities, drivers, networking software, and other software typically loaded onto a general-purpose computer. Application software 1210 could comprise an application program, firmware, or some other form of machine-readable processing instructions.

The above-described elements can be comprised of instructions that are stored on storage media. The instructions can be retrieved and executed by a processor. Some examples of instructions are software, program code, and firmware. Some examples of storage media are memory devices, tapes, disks, integrated circuits, and servers. The instructions are operational when executed by the processor to direct the processor to operate in accord with the invention. Those skilled in the art are familiar with instructions, processors, and storage media.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of designing a first antenna system in a communication system, the method comprising:
   retrieving demographic information of customers from a first database system;
   determining communication traffic based on the demographic information;
   retrieving parameters of a second antenna system from a second database system;
   determining an antenna system configuration for the first antenna system based on the communication traffic and the parameters of the second antenna system; and
   determining a performance of the first antenna system in response to determining the antenna system configuration for the first antenna system.

2. The method of claim 1 wherein the steps of determining the antenna system configuration for the first antenna system and determining the performance of the first antenna system are repeated until the first antenna system is optimized based on a maximum number of users, a geographic location, and government restrictions.

3. The method of claim 1 further comprising generating an antenna output based on the antenna system configuration and the performance of the first antenna system.

4. The method of claim 1 wherein the demographic information comprises age and income of the customers.

5. The method of claim 1 wherein the demographic information comprises an indication of whether the customer is residential or business.

6. The method of claim 1 wherein the parameters comprise a location of the second antenna system.

7. The method of claim 1 wherein the parameters comprise property rights of the second antenna system.

8. The method of claim 1 wherein the parameters comprise frequency and power of the second antenna system.

9. The method of claim 1 wherein determining the antenna system configuration for the first antenna system comprises:
   retrieving access road information from a third database system;
   retrieving topography information from a fourth database system;
   retrieving land usage information from a fifth database system; and
   retrieving image information from a sixth database system.

10. The method of claim 1 wherein the first antenna system comprises a fixed wireless communication system.

11. The method of claim 10 wherein the first antenna system comprises a Multichannel Multipoint Distribution System (MMDS).

12. The method of claim 1 wherein the second antenna system comprises a cellular antenna system.

13. The method of claim 1 wherein determining the antenna system configuration further comprises determining a location of the first antenna system.

14. The method of claim 1 further comprising generating a submission for government licenses for location, frequency, and power.

15. The method of claim 1 wherein determining the communication traffic further comprises calculating a weighted average throughput.

16. The method of claim 1 wherein determining the communication traffic further comprises determining traffic weighting patterns based on penetration rates and data throughputs.

17. The method of claim 1 wherein determining the performance of the first antenna system further comprises executing a radio frequency analysis based on the first antenna system.

18. The method of claim 1 wherein determining the performance of the first antenna system further comprises executing a traffic simulation based on the first antenna system.

19. The method of claim 1 wherein determining the performance of the first antenna system further comprises executing an interference analysis based on the first antenna system.

20. A design system for designing a first antenna system, the design system comprising:
   a processor system configured to retrieve demographic information of customers from a first database system, determine communication traffic based on the demographic information, retrieve parameters of a second antenna system from a second database system, determine an antenna system configuration for the first antenna system based on the communication traffic and the parameters of the second antenna system, and determine a performance of the first antenna system in response to determining the antenna system configuration for the first antenna system; and
   an interface connected to the processor and configured to transfer the demographic information from the first database system to the processor and transfer the parameters of the second antenna system from the second database system.

21. The design system of claim 20 wherein the processor system is configured to repeatedly determine the antenna system configuration for the first antenna system and determine the performance of the first antenna system until the first antenna system is optimized based on a maximum number of users, a geographic location, and government restrictions.

22. The design system of claim 20 wherein the processor system is configured to generate an antenna output based on the antenna system configuration and the performance of the first antenna system.

23. The design system of claim 20 wherein the demographic information comprises age and income of the customers.

24. The design system of claim 20 wherein the demographic information comprises an indication of whether the customer is residential or business.

25. The design system of claim 20 wherein the parameters comprise a location of the second antenna system.

26. The design system of claim 20 wherein the parameters comprise property rights of the second antenna system.

27. The design system of claim 20 wherein the parameters comprise frequency and power of the second antenna system.

28. The design system of claim 20 wherein the processor system is configured to retrieve access road information from a third database system, retrieve topography information from a fourth database system, retrieve land usage information from a fifth database system, and retrieve image information from a sixth database system.

29. The design system of claim 20 wherein the first antenna system comprises a fixed wireless communication system.

30. The design system of claim 29 wherein the first antenna system comprises a Multichannel Multipoint Distribution System (MMDS).

31. The design system of claim 20 wherein the second antenna system comprises a cellular antenna system.

32. The design system of claim 20 wherein the processor system is configured to determine a location of the first antenna system.

33. The design system of claim 20 wherein the processor system is configured to generate a submission for government licenses for location, frequency, and power.

34. The design system of claim 20 wherein the processor system is configured to calculate a weighted average throughput.

35. The design system of claim 20 wherein the processor system is configured to determine traffic weighting patterns based on penetration rates and data throughputs.

36. The design system of claim 20 wherein the processor system is configured to execute a radio frequency analysis based on the first antenna system.

37. The design system of claim 20 wherein the processor system is configured to execute a traffic simulation based on the first antenna system.

38. The design system of claim 20 wherein the processor system is configured to execute an interference analysis based on the first antenna system.

39. A software product for designing a first antenna system in a communication system, the software product comprising:
design software operational when executed by a processor to direct the processor to retrieve demographic information of customers from a first database system, determine communication traffic based on the demographic information, retrieve parameters of a second antenna system from a second database system, determine an antenna system configuration for the first antenna system based on the communication traffic and the parameters of the second antenna system, and determine a performance of the first antenna system in response to determining the antenna system configuration for the first antenna system; and
a storage medium configured to store the design software.

40. The software product of claim 39 wherein the design software is operational when executed by the processor to direct the processor to repeatedly determine the antenna system configuration for the first antenna system and determine the performance of the first antenna system until the first antenna system is optimized based on a maximum number of users, a geographic location, and government restrictions.

41. The software product of claim 39 wherein the design software is operational when executed by the processor to direct the processor to generate an antenna output based on the antenna system configuration and the performance of the first antenna system.

42. The software product of claim 39 wherein the demographic information comprises age and income of the customers.

43. The software product of claim 39 wherein the demographic information comprises an indication of whether the customer is residential or business.

44. The software product of claim 39 wherein the parameters comprise a location of the second antenna system.

45. The software product of claim 39 wherein the parameters comprise property rights of the second antenna system.

46. The software product of claim 39 wherein the parameters comprise frequency and power of the second antenna system.

47. The software product of claim 39 wherein the design software is operational when executed by the processor to direct the processor to retrieve access road information from a third database system, retrieve topography information from a fourth database system, retrieve land usage information from a fifth database system, and retrieve image information from a sixth database system.

48. The software product of claim 39 wherein the first antenna system comprises a fixed wireless communication system.

49. The software product of claim 48 wherein the first antenna system comprises a Multichannel Multipoint Distribution System (MMDS).

50. The software product of claim 39 wherein the second antenna system comprises a cellular antenna system.

51. The software product of claim 39 wherein the design software is operational when executed by the processor to direct the processor to determine a location of the first antenna system.

52. The software product of claim 39 wherein the design software is operational when executed by the processor to direct the processor to generate a submission for government licenses for location, frequency, and power.

53. The software product of claim 39 wherein the design software is operational when executed by the processor to direct the processor to calculate a weighted average throughput.

54. The software product of claim 39 wherein the design software is operational when executed by the processor to determine traffic weighting patterns based on penetration rates and data throughputs.

55. The software product of claim 39 wherein the design software is operational when executed by the processor to direct the processor to execute a radio frequency analysis based on the first antenna system.

56. The software product of claim 39 wherein the design software is operational when executed by the processor to direct the processor to execute a traffic simulation based on the first antenna system.

57. The software product of claim 39 wherein the design software is operational when executed by the processor to direct the processor to execute an interference based on the first antenna system.

* * * * *